US012723594B1

(12) United States Patent
Ni et al.

(10) Patent No.: US 12,723,594 B1
(45) Date of Patent: Sep. 1, 2026

(54) **SUPERHYDROPHOBIC BLADE OF *Carex tristachya* TYPE**

(71) Applicant: Jiangsu University, Zhenjiang City (CN)

(72) Inventors: Dan Ni, Zhenjiang City (CN); Bo Gao, Zhenjiang City (CN); Yuquan Zhang, Zhenjiang City (CN); Ning Zhang, Zhenjiang City (CN); Jinyu Yang, Zhenjiang City (CN)

(73) Assignee: Jiangsu University, Zhenjiang City (CN)

( * ) Notice: Subject to any disclaimer, the term of this patent is extended or adjusted under 35 U.S.C. 154(b) by 0 days.

(21) Appl. No.: 19/401,553

(22) Filed: Nov. 26, 2025

(30) Foreign Application Priority Data

Apr. 7, 2025 (CN) ......................... 202510427202.2

(51) Int. Cl.
*F04D 29/38* (2006.01)
*B05D 5/08* (2006.01)
*F04D 19/00* (2006.01)

(52) U.S. Cl.
CPC ............. *F04D 29/38* (2013.01); *F04D 19/00* (2013.01); *B05D 5/08* (2013.01)

(58) Field of Classification Search
CPC .......... F04D 29/26; F04D 29/28; F04D 29/38; F04D 29/384; F04D 29/388; F04D 19/00; F01D 5/00; F01D 5/02; F01D 5/12; F01D 5/14; F05D 2300/512; F03D 1/06; B05D 5/08
See application file for complete search history.

(56) References Cited

U.S. PATENT DOCUMENTS

| | | | |
|---|---|---|---|
| 11,230,928 B1 | 1/2022 | Foster | |
| 2010/0112286 A1* | 5/2010 | Bahadur | B01L 3/502746 428/141 |
| 2020/0003120 A1* | 1/2020 | Heneveld | F02C 7/12 |

FOREIGN PATENT DOCUMENTS

| | | | | |
|---|---|---|---|---|
| CN | 208252430 U | 12/2018 | | |
| CN | 209294124 U | 8/2019 | | |
| CN | 212202322 U | 12/2020 | | |
| CN | 116213943 A * | 6/2023 | | B23K 26/362 |
| JP | 2005069236 A | 3/2005 | | |
| JP | 2009133271 A | 6/2009 | | |

OTHER PUBLICATIONS

CN_116213943_A_Machine Translation (Guan, Y.) Jun. 2, 2023. [retrieved on Jun. 2, 2026] Retrieved from: Espacenet (Year: 2023).*
Notification to Grant Patent Right for Invention dated Oct. 2, 2025 in SIPO application No. CN202510427202.2, 3 pages.
Retrieval report—First search dated Sep. 27, 2025 in SIPO application No. CN202510427202.2, 11 pages.

* cited by examiner

*Primary Examiner* — Elton K Wong
(74) *Attorney, Agent, or Firm* — Cooper Legal Group, LLC

(57) ABSTRACT

A superhydrophobic blade of the *Carex tristachya* type is provided, including: a hub and blades fixed on the hub. A leaf-vein-like configuration is provided on the surface of the blades. The leaf-vein-like configuration is a grooved structure. The leaf-vein-like configuration divides the blades into multiple regions, and multiple cell-like protrusion configurations are arranged within the regions. A hydrophobic layer is coated on the surface of each of the blades.

10 Claims, 7 Drawing Sheets

SUPERHYDROPHOBIC BLADE OF *Carex tristachya* TYPE

CROSS-REFERENCE TO RELATED APPLICATIONS

This application claims priority to Chinese Patent Application No. 202510427202.2, filed on Apr. 7, 2025, the contents of which are hereby incorporated by reference.

TECHNICAL FIELD

The present disclosure belongs to the technical field of fluid machinery, and particularly relates to a superhydrophobic blade of the *Carex tristachya* type.

BACKGROUND

In nature, many plant leaves exhibit superhydrophobicity, such as lotus leaves and peanut leaves. The surface structure and chemical composition of these leaves are the key factors for achieving superhydrophobic properties. The surface microstructure of *Carex tristachya* leaves mainly presents typical structural forms such as monolayer convex hull type and reticular hollow type. These special surface structures provide the leaves with physical roughness, increase the contact angle when droplets come into contact with the surface, thereby enhancing the hydrophobicity of the leaves. Moreover, the surface of *Carex tristachya* leaves contains wax, which forms a protective film on the surface, further increasing the hydrophobicity of the leaves.

In existing blades, the friction between the fluid and the blades is relatively high, which reduces the operational efficiency of the machinery. For this reason, we provide a blade with a superhydrophobic surface to reduce solid-liquid adhesion, while also reducing the adhesion of dirt and deposits, in order to achieve improved performance and reliability of fluid machinery during operation.

SUMMARY

The purpose of the present disclosure is to provide a superhydrophobic blade of the *Carex tristachya* type to solve the above problems.

To achieve the above purpose, the present disclosure provides the following solution:

A superhydrophobic blade of the *Carex tristachya* type, which includes a hub and multiple blades fixed on the hub. A leaf-vein-like configuration is provided on a surface of each of the blades, the leaf-vein-like configuration is a grooved structure. The leaf-vein-like configuration divides the blade into multiple areas, and multiple cell-like protrusion configurations are distributed within the areas. A hydrophobic layer is coated on the surface of the blade.

In some embodiments, the leaf-vein-like configuration includes:

- a longitudinal groove located on the centerline of the blade;
- several sets of oblique transverse groove assemblies arranged at intervals along a length direction of the longitudinal groove, where each of the oblique transverse groove assemblies includes two oblique transverse grooves, and the two oblique transverse grooves are symmetrically arranged about the longitudinal groove;
- where the longitudinal groove is in communication with the oblique transverse grooves; and an included angle is provided between the longitudinal groove and the oblique transverse grooves; and
- the longitudinal groove and the oblique transverse grooves have the same structure.

In some embodiments, the cell-like protrusion configuration is a truncated pyramid structure, a bottom surface and a top surface of the cell-like protrusion configuration are both square structures, and a side length a of the bottom surface of the cell-like protrusion configuration is greater than a side length b of the top surface of the cell-like protrusion configuration.

In some embodiments, the hydrophobic layer includes a surface hydrophobic gel coating, and the surface hydrophobic gel coating is applied to the surface of the blade.

In some embodiments, a thickness of the surface hydrophobic gel coating is 120 micrometers.

In some embodiments, a spacing Δ Y between two adjacent cell-like protrusion configurations along the direction of the longitudinal groove is:

$$\Delta Y = k_2 \cdot a, \text{ where } 1.5 \le k_2 \le 3.$$

In some embodiments, the spacing Δ X between two adjacent cell-like protrusion configurations along a direction perpendicular to the longitudinal groove is:

$$\Delta X = k_1 \cdot a, \text{ where } 1.5 \le k_1 \le 3.$$

In some embodiments, the side length a of the bottom square of the cell-like protrusion configuration is:

$$a = k_3 \cdot d_1, \text{ where } 0.02 \le k_3 \le 0.1.$$

The side length b of the top square of the cell-like protrusion configuration is:

$$b = k_4 \cdot a, \text{ where } 0.7 \le k_4 \le 0.95.$$

The base angle θ of the side trapezoid of the cell-like protrusion configuration ranges from 10 degrees to 45 degrees.

The protrusion height h of the cell-like protrusion configuration is:

$$h = k_5 \cdot a, \text{ where } 0.05 \le k_5 \le 0.3.$$

Where $d_1$ is the blade root diameter of the blade, and $d_2$ is the blade tip diameter of the blade.

In some embodiments, the groove depth Δ Z of the leaf-vein-like configuration is:

$$\Delta Z = k_6 \cdot a, \text{ where } 0.1 \le k_6 \le 0.3.$$

In some embodiments, arc transition surfaces are provided at the junctions between the longitudinal groove and surface of the blade, and at junctions between the oblique transverse grooves and the surface of the blade.

Compared with the existing technology, the present disclosure has the following advantages and technical effects.

The blade with superhydrophobic performance of the *Carex tristachya* type of the present disclosure includes the hub and the blades arranged on the hub. The blade surface is provided with a *Carex tristachya*-inspired cell-like protrusion configuration and leaf-vein-like configuration, and the hydrophobic layer is uniformly applied on the blade surface. Compared with conventional technology, the present disclosure imparts superhydrophobicity to the blade by simulating the structure of the hydrophobic leaf of *Carex tristachya*, thereby improving the self-cleaning ability of the blade. Water droplets on the blade surface form spheres and roll off quickly, simultaneously carrying away dust and impurities, keeping the blade surface clean. The blade surface may repel water and oily substances, preventing the adhesion of microorganisms, dirt, and corrosive substances, thereby extending the service life of the blade. The self-cleaning and anti-fouling characteristics of the blade reduce the reliance on chemical cleaning agents, while its low water resistance and anti-corrosion performance also reduce energy consumption, providing significant environmental advantages.

BRIEF DESCRIPTION OF THE DRAWINGS

In order to more clearly illustrate the technical solutions in the embodiments of the present disclosure or the prior art, the following will briefly introduce the drawings needed for the embodiments. Apparently, the drawings in the following description are only some embodiments of the present disclosure. For those of ordinary skill in the art, other drawings may be obtained based on these drawings without creative effort.

DETAILED DESCRIPTION OF THE EMBODIMENTS

The following will clearly and completely describe the technical solutions in the embodiments of the present disclosure in combination with the accompanying drawings. Apparently, the described embodiments are only a part of the embodiments of the present disclosure, and not all of them. Based on the embodiments of the present disclosure, all other embodiments obtained by a person of ordinary skill in the art without creative efforts fall within the scope of protection of the present disclosure.

In order to make the above purposes, features, and advantages of the present disclosure more clearly understood, the following further explains the present disclosure in detail with reference to the accompanying drawings and specific implementation methods.

Figure 1:
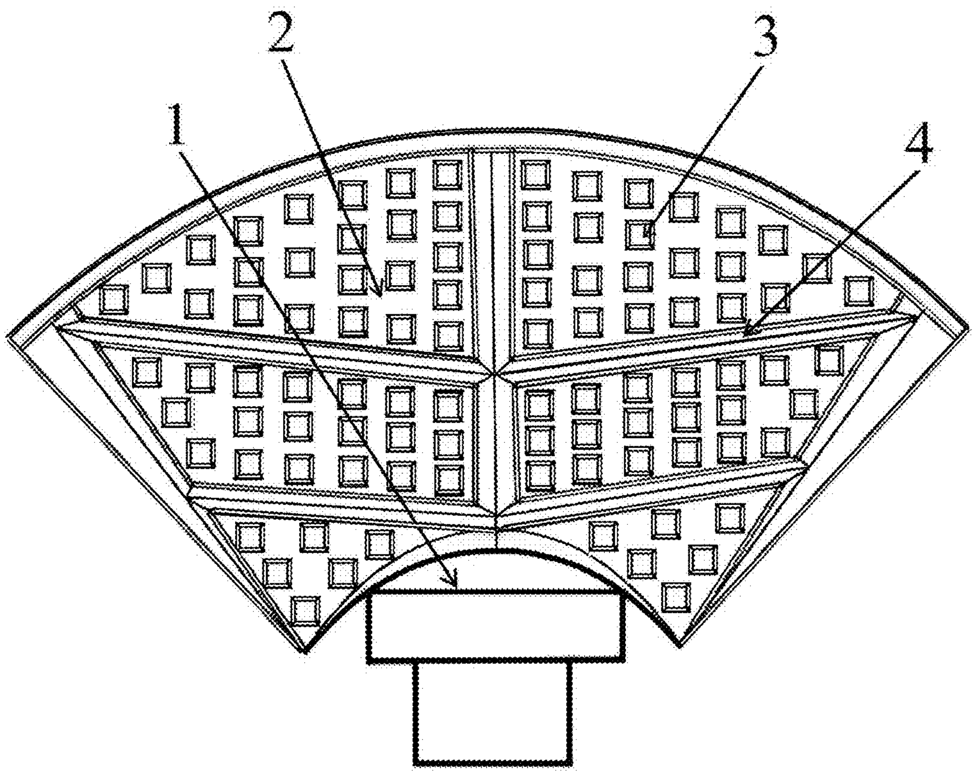
FIG. 1 is a front view of a bionic *Carex tristachya*-type blade of the present disclosure.
Figure 2:
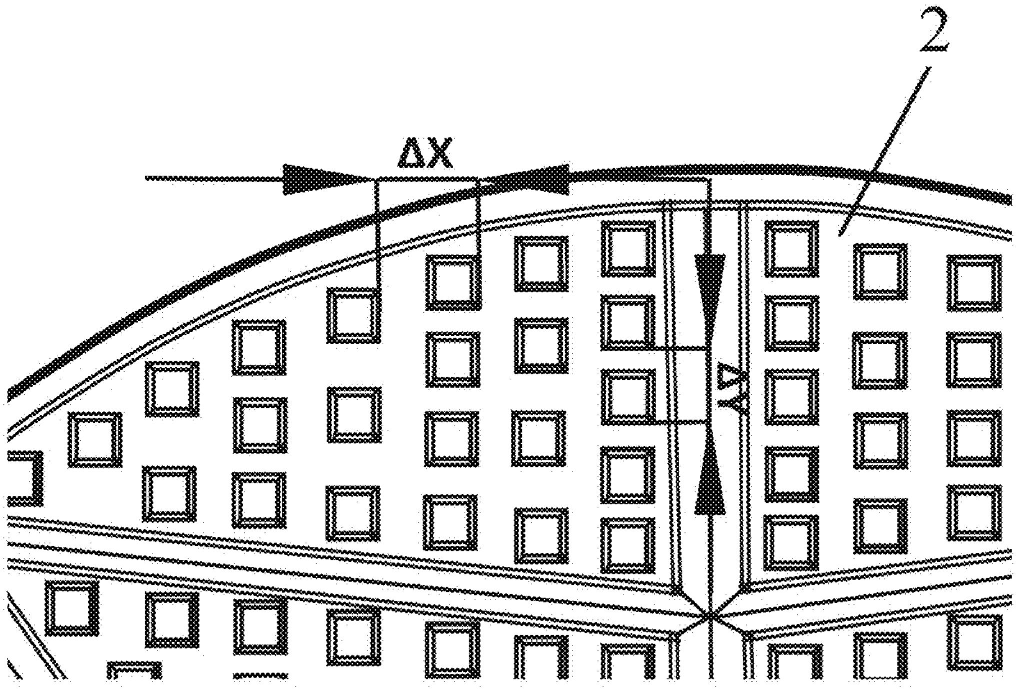
FIG. 2 is a partial schematic view of a surface of the bionic *Carex tristachya*-type blade of the present disclosure.
Figure 3:
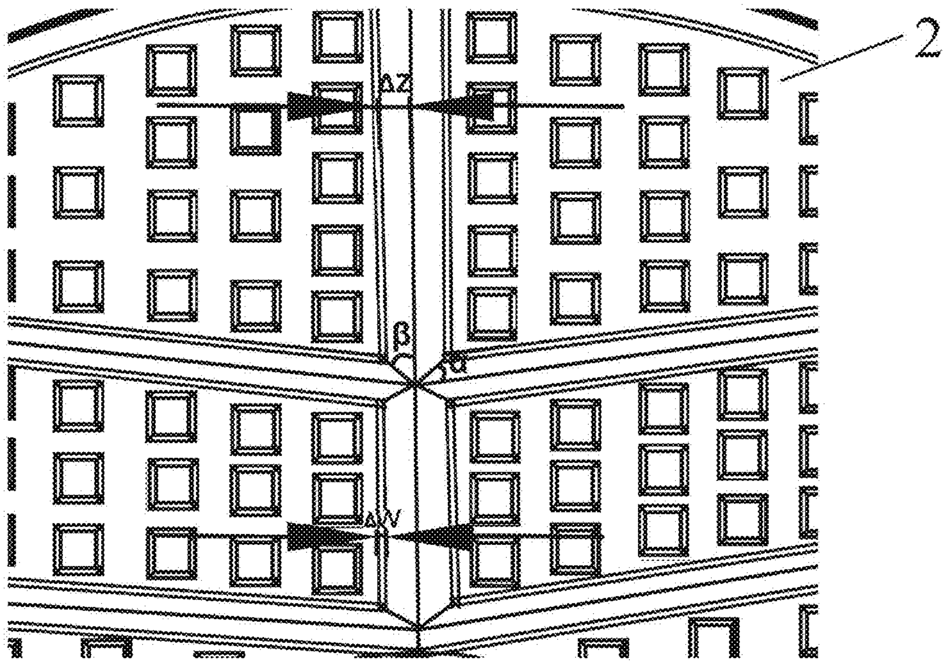
FIG. 3 is a schematic diagram of leaf-vein-like configuration dimensions of the bionic *Carex tristachya*-type blade of the present disclosure.
Figure 4:
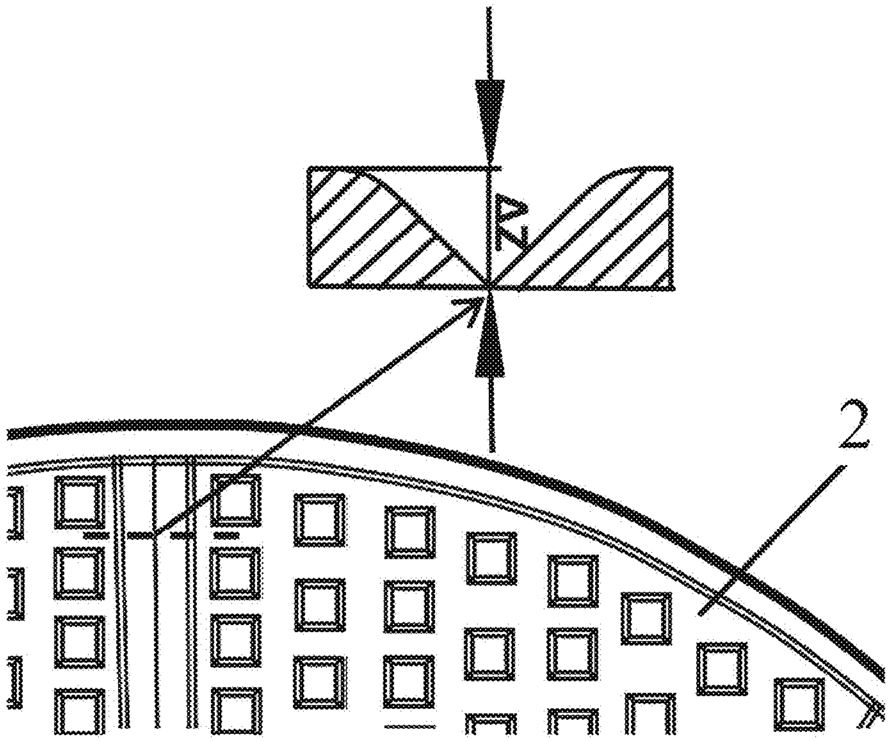
FIG. 4 is a schematic diagram of cross-sectional dimensions of the leaf-vein-like configuration of the bionic *Carex tristachya*-type blade of the present disclosure.
Figure 5:
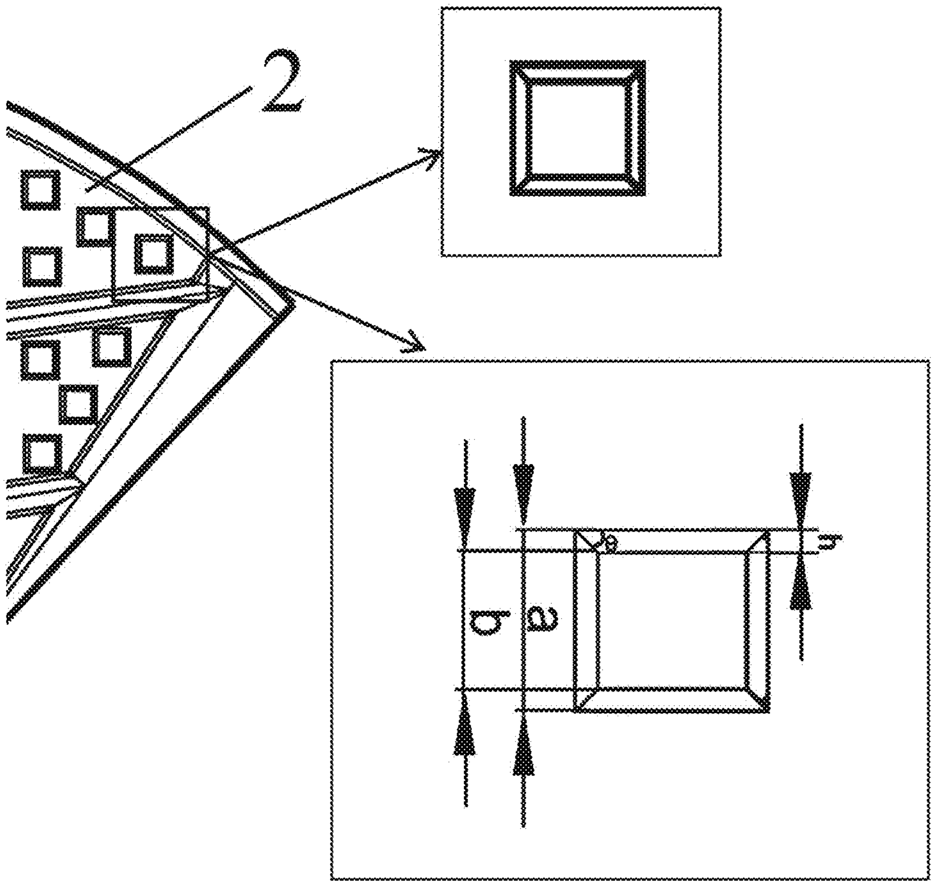
FIG. 5 is a schematic diagram of cell-like protrusion dimensions of the bionic *Carex tristachya*-type blade of the present disclosure.
Figure 6:
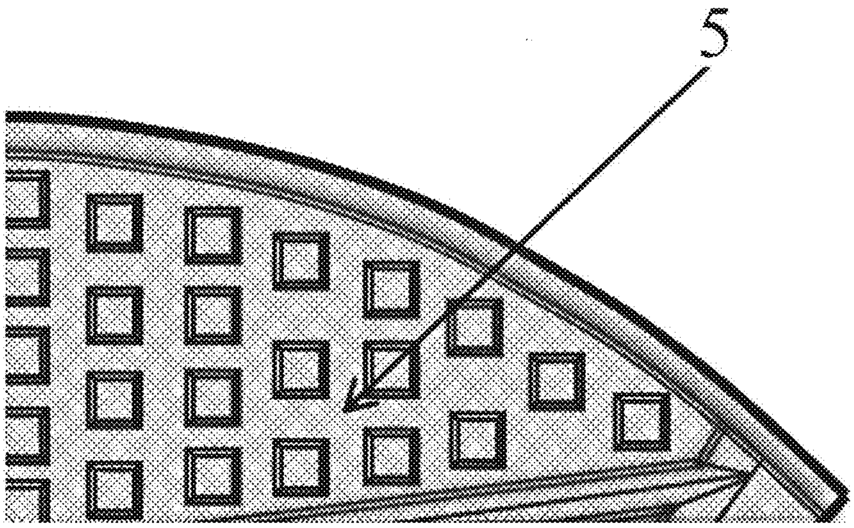
FIG. 6 is a schematic diagram of a hydrophobic gel coating on the blade surface of the present disclosure.
Figure 7:
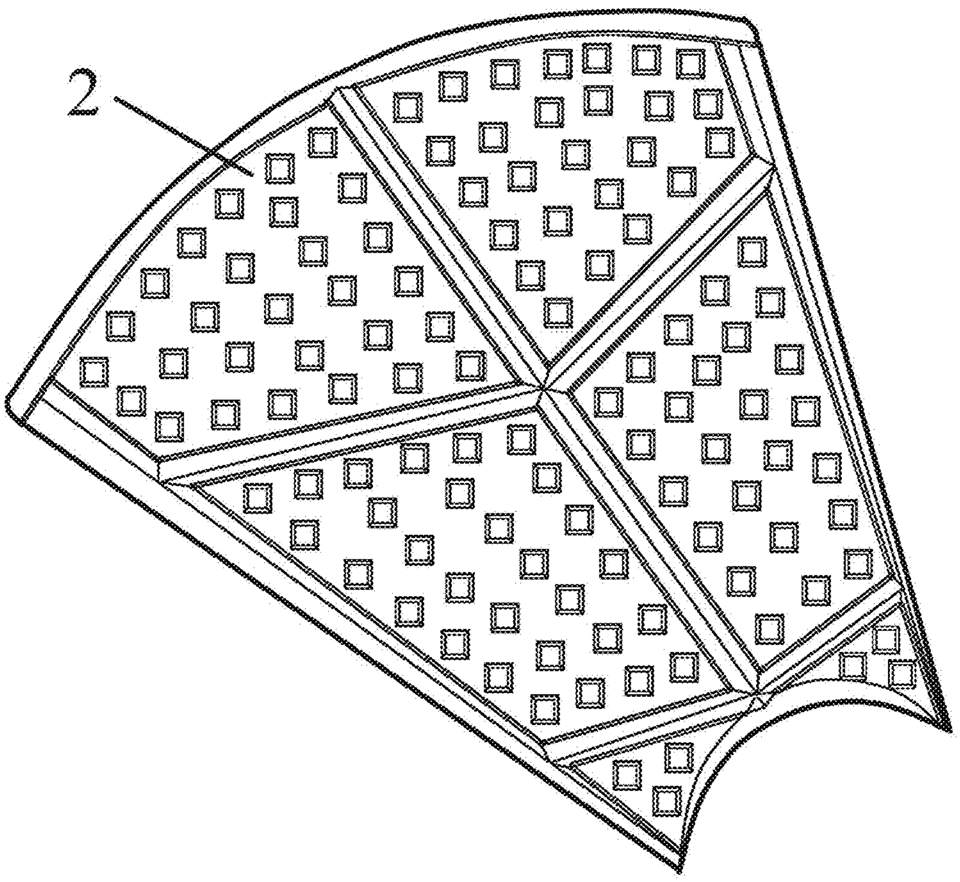
FIG. 7 is a schematic diagram of another embodiment of the present disclosure.

Referring to FIGS. 1 to 7, the present disclosure discloses a superhydrophobic blade of the *Carex tristachya* type, which includes a hub 1 and multiple blades 2 fixed on the hub 1. The surface of the blade 2 is provided with a leaf-vein-like configuration 4. The leaf-vein-like configuration 4 is a grooved structure. The leaf-vein-like configuration 4 divides the blade 2 into multiple regions, and multiple cell-like protrusion configurations 3 are arranged within the regions.

A hydrophobic layer is coated on the surface of the blade 2.

The blade with superhydrophobic performance of the *Carex tristachya* type of the present disclosure includes a hub 1 and a number of blades 2 arranged on the hub 1. The surface of the blade 2 is provided with a cell-like protrusion configuration 3 and a leaf-vein-like configuration 4 imitating the *Carex tristachya* type, and a hydrophobic layer is uniformly applied on the surface of the blade 2. Compared with conventional technology, the present disclosure imparts superhydrophobicity to the blade 2 by simulating the structure of the hydrophobic leaf of *Carex tristachya*, thereby improving the self-cleaning ability of the blade 2. Water droplets on the surface of the blade 2 form spheres and roll off quickly, simultaneously carrying away dust and impurities, keeping the surface of the blade 2 clean. The surface of the blade 2 may repel water and oily substances, preventing the adhesion of microorganisms, dirt, and corrosive substances, thereby extending the service life of the blade 2. The self-cleaning and anti-fouling characteristics of the blade 2 reduce the reliance on chemical cleaning agents, while its low water resistance and anti-corrosion performance also reduce energy consumption, providing significant environmental advantages.

As an optional implementation, the hydrophobic layer includes a surface hydrophobic gel coating 5, and the surface hydrophobic gel coating 5 is applied to the surface of the blade 2.

As an optional implementation, the thickness of the surface hydrophobic gel coating 5 is 120 micrometers.

When the surface hydrophobic gel coating 5 covering the surface of the mechanical blade 2 is used to ensure its hydrophobicity, the thickness of the coating is an important parameter. The thickness of the surface hydrophobic gel coating 5 of the present disclosure is about 120 micrometers. This thickness range may provide good superhydrophobic performance, making the coating surface flat, continuous, and dense, possessing low surface energy substances and micro-nano level structures, which conforms to the Cassie-Baxter model. At the same time, the water contact angle (WCA) of the coating is 167.2 degrees, and the sliding angle (SA) is 2.2 degrees, showing excellent superhydrophobicity.

As an optional implementation, the leaf-vein-like configuration 4 includes:

- a longitudinal groove located on the centerline of the blade 2;
- several oblique transverse groove assemblies arranged at intervals along the length direction of the longitudinal groove, where each oblique transverse groove assembly includes two oblique transverse grooves, and the two oblique transverse grooves are symmetrically arranged about the longitudinal groove.

The longitudinal groove is in communication with the oblique transverse grooves; and an included angle is provided between the longitudinal groove and the oblique transverse groove.

The longitudinal groove and the oblique transverse grooves have the same structure.

As an optional implementation, the cell-like protrusion configuration 3 is a truncated pyramid structure, both the bottom surface and the top surface of the cell-like protrusion configuration 3 are square structures, and the side length a of the bottom surface of the cell-like protrusion configuration 3 is greater than the side length b of the top surface of the cell-like protrusion configuration 3.

The basic shape of the cell-like protrusion configuration 3 is a protruding truncated pyramid structure, with the top and bottom surfaces being squares of unequal area. The four side surfaces of the cell-like protrusion configuration 3 are trapezoidal in shape, and the upper and lower sides of the trapezoid are the side lengths of the top and bottom squares respectively. This ensures that the side surfaces have an inclination angle, which reduces the impact loss of the incoming flow.

The basic shape of the leaf-vein-like configuration 4 is symmetrical long grooves, including one longitudinal groove and several sets of pairwise symmetrical oblique transverse grooves. The junctions between the groove edges and the blade surface are transitioned by rounded edges. Each groove includes two symmetrical groove surfaces, which are connected at a certain angle. At the junction of the longitudinal groove and the oblique transverse grooves, the groove surfaces also have a specific angle range.

The multiple cell-like protrusion configurations 3 are distributed in a systematic manner along the direction of the fluid streamlines on the surface of the blade 2 according to a certain arrangement pattern, mainly covering the pressure surface and the suction surface of the blade 2, and distributed on the blade tip end surface as needed.

The cell-like protrusion configurations 3 are arranged according to specific lengths at different diameter positions on the blade, and their distribution range covers 30% to 95% of the chord length of the blade 2.

As an optional implementation, the spacing Δ Y between two adjacent cell-like protrusion configurations 3 along the direction of the longitudinal groove is:

$$\Delta Y = k_2 \cdot a;$$

where $1.5 \le k_2 \le 3$.

As an optional implementation, the spacing Δ X between two adjacent cell-like protrusion configurations 3 along the direction perpendicular to the longitudinal groove is:

$$\Delta X = k_1 \cdot a;$$

where $1.5 \le k_1 \le 3$.

As an optional implementation, the side length a of the bottom square of the cell-like protrusion configuration 3 is:

$$a = k_3 \cdot d_1;$$

where $0.02 \le k_3 \le 0.1$.

The side length b of the top square of the cell-like protrusion configuration 3 is:

$$b = k_4 \cdot a;$$

where $0.7 \le k_4 \le 0.95$.

The base angle θ of the side trapezoid of the cell-like protrusion configuration 3 ranges from 10 degrees ≤θ≤45 degrees.

The protrusion height h of the cell-like protrusion configuration 3 is:

$$h = k_5 \cdot a;$$

where $0.05 \le k_5 \le 0.3$.

Among them, $d_1$ is the blade root diameter of the blade 2, and $d_2$ is the blade tip diameter of the blade 2.

The specific parameters of the cell-like protrusion configuration 3 include: the side length a of the bottom square, the side length b of the top square, the base angle θ of the side trapezoid, and the protrusion height h. The arrangement parameters of the several cell-like protrusion configurations 3 include the transverse spacing Δ X in the direction perpendicular to the streamlines, and the longitudinal spacing Δ Y in the direction along the streamlines.

The side length a of the bottom square is a given value.

When designing the above superhydrophobic configuration, the determination of its geometric parameters needs to be based on the characteristics of the fluid medium and the specific operating conditions. The following is a specific introduction to the value selection of each parameter.

The several cell-like protrusion configurations 3 are usually arranged systematically, and the transverse spacing Δ X and longitudinal spacing Δ Y between configurations are one of the key design parameters affecting their hydrophobic effect.

In order to meet the needs of different operating conditions and adjust the distribution range, the transverse spacing between cell-like protrusion configurations 3 is: $\Delta X = k_1 \cdot a$, where $k_1$ is the proportionality coefficient, generally, $1.5 \le k_1 \le 3$ is taken to satisfy its distribution range. a is the side length of the bottom square of the cell-like protrusion configuration 3.

The longitudinal spacing between cell-like protrusion configurations 3 is: $\Delta Y = k_2 \cdot a$, where: $k_2$ is the proportionality coefficient, generally, $1.5 \le k_2 \le 3$ is taken to satisfy its distribution range. a is also the side length of the bottom square of the cell-like protrusion configuration 3.

The cell-like protrusion configuration 3 is a three-dimensional truncated pyramid structure, and this configuration is preferentially set in the area from the hub 1 to the disc. Its distribution range is between $1.2d_1$ and $0.9d_2$, where $d_1$ is the blade root diameter of the blade 2, and $d_2$ is the blade tip diameter of the blade 2.

To meet the requirements of distribution density, the side length a of the bottom square of the cell-like protrusion configuration 3 satisfies: $a = k_3 \cdot d_1$, where $k_3$ is the proportionality coefficient, generally, $0.02 \le k_3 \le 0.1$ is taken to satisfy its distribution density.

To avoid excessive flow resistance, the side length b of the top square of the cell-like protrusion configuration 3 satisfies: $b = k_4 \cdot a$, where $k_4$ is the proportionality coefficient, generally, $0.7 \le k_4 \le 0.95$ is taken. The value range of the base angle θ of the side trapezoid is usually between 10 degrees and 45 degrees. The protrusion height h satisfies: $h = k_5 \cdot a$, where $k_5$ is the proportionality coefficient, generally, $0.05 \le k_5 \le 0.3$ is taken.

As an optional implementation, the groove depth Δ Z of the leaf-vein-like configuration 4 is:

$$\Delta Z = k_6 \cdot a;$$

where $0.1 \le k_6 \le 0.3$.

As an optional implementation, arc transition surfaces are provided at the junctions between the longitudinal groove and the surface of the blade 2, and at the junctions between the oblique transverse grooves and the surface of the blade 2.

The specific parameters of the leaf-vein-like configuration 4 include: the vein depth Δ Z, the chord length Δ W of the rounded edge at the junction between the groove edge and the blade surface, the angle α (absolute velocity angle) at the junction of the longitudinal and transverse veins, and the angle β (flow angle).

The leaf-vein-like configuration 4 intersected in the middle of the blade 2 presents a grid-like structure similar to the veins of a *Carex tristachya* leaf, which includes multiple intersecting lines forming multiple small areas, and these lines constitute a supporting framework on the blade surface. In the leaf-vein-like configuration 4, Δ Z represents the vein depth along the height direction of the blade 2. The size of the vein depth Δ Z has an important influence on the aerodynamic performance and structural strength of the blade 2. Δ Z may be expressed as a certain proportion of the thickness (t) of the blade 2, satisfying: $\Delta Z = k_6 \cdot a$, where $k_6$ is the proportionality coefficient, generally, $0.1 \le k_6 \le 0.3$ is taken, depending specifically on the application scenario and design requirements of the blade 2.

As an addable implementation, the rounded chord length of the arc transition surface at the junction between the longitudinal groove and the oblique transverse grooves and the surface of the blade 2 is A W, and the value range of A W is:

1 millimeter≤ΔW≤10 millimeters.

The design of the rounded chord length may make the blade surface smoother and reduce the turbulence and separation of the fluid on the surface of the blade 2. Generally, 1 millimeter≤Δ W≤10 millimeters is taken. The specific value of the rounded chord length also needs to be comprehensively considered and optimally adjusted according to the actual application scenario of the blade, fluid properties, design goals, and other factors.

The angle α (absolute velocity angle) and the angle β (flow angle) at the junction of the longitudinal groove and the transverse groove of the leaf-vein-like configuration 4 are suggested angle parameters.

As an addable implementation, the angle between the bottom edge of the oblique transverse groove and the oblique edge of the longitudinal groove is α, and the calculation formula for a is:

$$\alpha = \arctan\left(\frac{V_m}{V_u}\right),$$

where, $V_m$ is the axial velocity, and Vu is the circumferential component velocity.

As an addable implementation, the angle between the bottom edge of the longitudinal groove and the oblique edge of the oblique transverse groove is β, and the calculation formula for β is:

$$\beta = \arctan\left(\frac{\omega_m}{\omega_u}\right),$$

where, $\omega_m$ is the axial component of the relative velocity, and $\omega_u$ is the circumferential component of the relative velocity.

The angle α (absolute velocity angle) may be calculated by the velocity triangle, and the formula is $$\alpha = \arctan\left(\frac{V_m}{V_u}\right),$$

where, $V_m$ is the axial velocity, and Vu is the circumferential component velocity.

The angle β (flow angle) may also be calculated by the velocity triangle, and the formula is $$\beta = \arctan\left(\frac{\omega_m}{\omega_u}\right),$$

where, $\omega_m$ is the axial component of the relative velocity, and Ou is the circumferential component of the relative velocity.

The angle α (absolute velocity angle) typically ranges from 10 degrees to 45 degrees, depending specifically on the position of the blade 2 and the flow characteristics of the fluid. At the impeller inlet, α is smaller, with values taken from 10 degrees to 20 degrees. While at the impeller outlet, α is larger, with values taken from 20 degrees to 45 degrees. The angle range of β (flow angle) is generally between 20 degrees and 60 degrees. For some blade designs requiring high efficiency, β is between 20 degrees and 30 degrees. While for blade designs requiring larger flow rates, β is between 30 degrees and 60 degrees.

The edges of the bionic *Carex tristachya*-type cell protrusion structure on the surface of the blade 2 adopt beveled transitions, and the junctions between the groove edges and the blade surface are treated with rounded corners, thereby reducing water resistance. This characteristic allows the blade to maintain good performance even under deep water or fluid impact conditions, and it may also reduce energy consumption.

In the description of the present disclosure, it is to be understood that the terms "longitudinal", "transverse", "upper", "lower", "front", "rear", "left", "right", "vertical", "horizontal", "top", "bottom", "inner", "outer", etc., indicate orientations or positional relationships based on those shown in the accompanying drawings. These terms are used only for the convenience of describing the present disclosure and do not indicate or imply that the referred apparatus or element must have a specific orientation or be constructed and operated in a specific orientation. Therefore, these terms are not to be construed as limiting the disclosure.

The embodiments described above are only illustrative of the optional modes of the present disclosure and are not intended to limit the scope of the present disclosure. Without departing from the design spirit of the present disclosure, various modifications and improvements made to the technical solutions of the present disclosure by those of ordinary skill in the art shall fall within the scope of protection defined by the claims of the present disclosure.

What is claimed is:

1. A superhydrophobic blade of *Carex tristachya* type, comprising:
- a hub; and
- a plurality of blades fixed on the hub, wherein a leaf-vein-like configuration is provided on a surface of each of the blades, the leaf-vein-like configuration is a grooved structure, the leaf-vein-like configuration divides each of the blades into a plurality of regions, and a plurality of cell-like protrusion configurations are arranged within the regions; and
- wherein a hydrophobic layer is coated on the surface of each of the blades.

2. The superhydrophobic blade of the *Carex tristachya* type according to claim 1, wherein the leaf-vein-like configuration comprises:
- a longitudinal groove located on a centerline of each of the blades;
- a plurality of sets of oblique transverse groove assemblies arranged at intervals along a length direction of the longitudinal groove, wherein each of the oblique transverse groove assemblies comprises two oblique transverse grooves, and the two oblique transverse grooves are symmetrically arranged about the longitudinal groove;
- wherein the longitudinal groove is in communication with the two oblique transverse grooves, and an included angle is formed between the longitudinal groove and the two oblique transverse grooves; and
- the longitudinal groove and the two oblique transverse grooves have an identical structure.

3. The superhydrophobic blade of the *Carex tristachya* type according to claim 2, wherein each of the cell-like protrusion configurations is a truncated pyramid structure, a bottom surface and a top surface of each of the cell-like protrusion configurations are both square structures, and a side length (a) of the bottom surface of each of the cell-like protrusion configurations is greater than a side length (b) of the top surface of each of the cell-like protrusion configurations.

4. The superhydrophobic blade of the *Carex tristachya* type according to claim 3, wherein a spacing (ΔY) between two adjacent cell-like protrusion configurations along a direction of the longitudinal groove is:

$$\Delta Y = k_2 \cdot a, \text{ wherein } 1.5 \leq k_2 \leq 3.$$

5. The superhydrophobic blade of the *Carex tristachya* type according to claim 3, wherein a spacing (ΔX) between two adjacent cell-like protrusion configurations along a direction perpendicular to the longitudinal groove is:

$$\Delta X = k_1 \cdot a, \text{ wherein } 1.5 \leq k_1 \leq 3.$$

6. The superhydrophobic blade of the *Carex tristachya* type according to claim 3, wherein a groove depth (A Z) of the leaf-vein-like configuration is:

$$\Delta Z = k_6 \cdot a, \text{ wherein } 0.1 \leq k_6 \leq 0.3.$$

7. The superhydrophobic blade of the *Carex tristachya* type according to claim 2, wherein arc transition surfaces are provided at junctions between the longitudinal groove and the surface of each of the blades and at junctions between the two oblique transverse grooves and the surface of each of the blades.

8. The superhydrophobic blade of the *Carex tristachya* type according to claim 1, wherein the hydrophobic layer comprises a surface hydrophobic gel coating, and the surface hydrophobic gel coating is applied to the surface of each of the blades.

9. The superhydrophobic blade of the *Carex tristachya* type according to claim 8, wherein a thickness of the surface hydrophobic gel coating is 120 micrometers.

10. The superhydrophobic blade of the *Carex tristachya* type according to claim 1, wherein a side length (a) of a bottom square of each of the cell-like protrusion configurations is:

$$a = k_3 \cdot d_1, \text{ wherein } 0.02 \leq k_3 \leq 0.1;$$

a side length (b) of a top square of each of the cell-like protrusion configurations is:

$$b = k_4 \cdot a, \text{ wherein } 0.7 \leq k_4 \leq 0.95;$$

a base angle (θ) of a side trapezoid of each of the cell-like protrusion configurations ranges from 10 degrees to 45 degrees;

a protrusion height (h) of each of the cell-like protrusion configurations is:

$$h = k_5 \cdot a, \text{ wherein } 0.05 \leq k_5 \leq 0.3; \text{ and}$$

wherein $d_1$ is a blade root diameter of each of the blades.

* * * * *